United States Patent [19]

Coutrot et al.

[11] Patent Number: 5,349,641
[45] Date of Patent: Sep. 20, 1994

[54] PROCESS FOR THE TRANSMISSION AND RECEPTION OF CONDITIONAL ACCESS PROGRAMMES WITH A REDUCED PROGRAMME SWITCHING TIME

[75] Inventors: Francoise Coutrot, Cesson Sevigne; Jean-Luc Giachetti, Rennes, both of France

[73] Assignees: France Telecom Establissement Autonome de Droit Public; Telediffusion de France, both of Paris, France

[21] Appl. No.: 105,056

[22] Filed: Aug. 12, 1993

[30] Foreign Application Priority Data

Aug. 13, 1992 [FR] France ................. 92 10002

[51] Int. Cl.⁵ ............................................. H04M 7/167
[52] U.S. Cl. .......................................... 380/10; 380/20
[58] Field of Search ..................... 380/10, 16, 20, 21

[56] References Cited

U.S. PATENT DOCUMENTS

| | | | |
|---|---|---|---|
| 4,797,919 | 1/1992 | Murray et al. | 380/20 X |
| 4,817,143 | 3/1989 | Murray | 380/20 |
| 4,937,866 | 6/1990 | Crowther et al. | 380/20 |
| 4,947,428 | 8/1990 | Guillou et al. | 380/20 |
| 5,224,161 | 6/1993 | Daniel et al. | 380/20 X |

FOREIGN PATENT DOCUMENTS 0161913 11/1985 European Pat. Off. .
0426923 5/1991 European Pat. Off. .

OTHER PUBLICATIONS

Union Europeenne De Radiodiffusion, Oct. 1986, pp. 213–243, G. T. Waters, "Specifications Des Systemes De La Famille MAC/Packets".

IEEE Transactions On Consumer Electronics, vol. 37, No. 3, Aug. 1991, pp. 441–448, J. R. Kingdom, "New Multipage Teletext Decoders".

*Primary Examiner*—Tod R. Swann
*Attorney, Agent, or Firm*—Oblon, Spivak, McClelland, Maier & Neustadt

[57] ABSTRACT

A process for the transmission and reception of scrambled conditional access programs, which are synchronously transmitted with entitlement control messages (ECM), with a reduced program switching time. The entitlement control messages (ECM) have check words, which are changed after a period of time called a phase, for descrambling the conditional access programs. The process includes transmitting main check messages (ECMp) for a main access program at a first frequency (Fp) and transmitting secondary check messages (ECMs) for secondary programs at a lower, second frequency (Fs). The secondary check messages (ECMs) are transmitted between two successive transmission of the main check messages (ECMp) such that all of the secondary check messages (ECMs) for each of the secondary programs are transmitted in a single phase. Therefore, a check word for any program is quickly acquired and program switching time is reduced.

5 Claims, 2 Drawing Sheets

PROCESS FOR THE TRANSMISSION AND RECEPTION OF CONDITIONAL ACCESS PROGRAMMES WITH A REDUCED PROGRAMME SWITCHING TIME

DESCRIPTION

1. Technical Field

The present invention relates to a transmission process and a reception process for conditional access programmes with a reduced programme switching or zapping time.

The invention can be used either with respect to the transmission, or with respect to the reception of programmes transmitted according to the transmission process, or both to transmission and reception. The invention applies to television, radio, messaging, data dissemination, etc.

2. Prior Art

A conditional access programme transmission and reception process fulfils three main functions:

a) The first is a scrambling/descrambling function. Scrambling can take place independently or simultaneously on the sound, picture, messages, data, etc., in order to make these components unintelligible. Descrambling is possible on the part of the receiver if the latter has a secret parameter called the check word.

b) The second is a check function, consisting of transmitting the access conditions to a programme or a component, as well as the check words permitting descrambling for authorized users. These informations are sent in Entitlement Control Messages or ECM, which are synchronized with the programme and are broadcast therewith. Hereinafter, the term ECM channel will be used for the transmission channel able to convey ECM messages for a particular access condition.

c) The third is a control function consisting of distributing access rights to users. There are several means for accessing a programme, among which reference can be made to those using the D2MAC/P Eurocrypt standard: subject, level or class subscription, as well as prior or impulse purchase for each performance, as well as outright or term-based purchase. These informations are sent in messages known as Entitlement Management Messages or EMM, which are not synchronized with the programme. They can be sent on transmission (which is the case for the D2MAC/P Eurocrypt standard) or can follow other channels (e.g. telephone system or post).

For example, a D2MAC/P Eurocrypt programme is constituted by several components, namely a video component, one or more sound components and one or more teletext components. Each of these components can be scrambled with different access conditions and therefore requires different ECM. For reasons of simplicity, it is assumed hereinafter that all the components of the programme are scrambled with the same access conditions and that consequently there is only one ECM channel for the complete programme. However, this simplification in no way limits the scope of the invention.

FIG. 1 shows several scrambled programmes. It is possible to see in diagrammatic form a programme P1 associated with a channel C(EMC)1 for conveying ECM permitting the descrambling of said programme on reception. FIG. 1 also shows a second programme P2 with its channel C(ECM)2, as well as a ith programme Pi with its channel C(ECM)i.

It is standard practice to regularly change the check words. For example, for the D2MAC/P Eurocrypt standard, these words are changed every 10.24 s. The life of a check word is called the phase. It is therefore necessary to send at least one ECM per phase in order to transmit to the decoders the new check word. In practice, ECM are repeated several times during a phase (2 ECM per second for D2MAC/P Eurocrypt) in order to permit a rapid ECM acquisition time for a televiewer connecting into a programme.

FIG. 2 shows, for a random programme P, the evolution of the content of the channel C(ECM) in time for a phase of rank i and for the start of the following phase of rank i+1. In phase i, each ECM is represented by a hatched band. In D2MAC/P Eurocrypt, the time separating two consecutive ECM is 0.5 s (this time being designated Tecm hereinafter). Therefore the rate of the ECM channel is equal to 2 ECM per second for each programme.

Although this process is satisfactory in certain respects, it suffers from a disadvantage when the user changes programme. Thus, zapping is delayed by operations linked with the conditional access.

For any conditional access transmission system, the switching time is essentially dependent on the following: the signal acquisition time Tacq, the service channel acquisition time Tvoie-serv, the service channel conveying all the informations on the structure of the multiplex (position of the video component, number and position of the sound components, address of the ECM chanel, etc.), the maximum waiting time of an ECM, designated Tecm, the initialization time of the PRBS (abbreviation of Pseudo Random Binary System), designated Tinit-prbs.

In the case of a digital signal, it is necessary to add the signal decompression time, designated Tdecomp.

Among the previously described times, only Tecm, Tcalc and Tinit-prbs are linked with the conditional access, the other times existing even without scrambling.

In order to further define the question of times, use will be made of the example of a system operating under D2MAC/P Eurocrypt. In this case, all the times are totalized and no action can take place before having the result of the preceding action. The ECM are presently transmitted every 0.5 s (Tecm=0.5 s). The time of processing the ECM per card such as the card PC2 is equal to the sum of the selection time of the provider zone in the card (equal to or less than 50 ms), the calculating time (on average 260 ms) and the result reading time (equal to or less than 40 ms). It is therefore approximately 350 ms. It should decrease with the second version of the card PC2 (PC2.2). The PRBS initialization time is negligible (equal to or below 5 µs).

Thus, at present, the programme switching time is:
$$Tacq + Tvoie\text{-}serv + Tecm + Tcalc = Tacq + Tvoie\text{-}serv + 0.850\ s.$$

The object of the present invention is to obviate this disadvantage by proposing a process making it possible to reduce the switching time by reducing Tecm and Tcalc, whilst making it possible to parallelize the processing operations.

DESCRIPTION OF THE INVENTION

In order to achieve this object, the invention proposes a transmission process, in which transmission takes place with each programme of the check message characteristic of said programme (referred to as the main ECM, designated ECMp) with a certain frequency (Fp) and the check messages characteristic of the other programmes, which will be referred to as secondary ECM, designated ECMs, but with a lower frequency (Fs).

The present invention also relates to a process for the reception of programmes transmitted in accordance with the transmission process described hereinbefore. According to the invention, use is made of the main check message (ECMp), characteristic of the selected programme in order to descramble the latter and storage takes place of all the other secondary check messages (ECMs) of the other programmes in order to be able to rapidly descramble such another programme which has been selected.

D is the rate of the ECM channel of each programme (expressed in ECM/s), Fp is the transmission frequency of the main ECMp (in ECM/s), Fs is the transmission frequency of the secondary ECMs (in ECM/s), N is the number of transmitted programmes.

The total rate of the ECM channel of each programme becomes $D = Fp + Fs(N-1)$.

Several variants are possible as a function of the acceptable ECM rate. In order to reduce this rate, it would be possible to only send one secondary ECM per phase.

DETAILED DESCRIPTION OF AN EMBODIMENT

The structure of the ECM messages will not be described here, because it does not concern the invention and is of a conventional nature. In this connection reference can be made to the European specifications relating to the MAC/PACKET standard, such as e.g. document CLC/TC 106 of January 1988 entitled "Specification of the MAC/PACKET Access Control System: Protocol for ECM and EMM Messages", (Dec. 12, 1987).

The following description relates to two examples of multiplexing of different ECM messages, namely main ECM characteristic of the selected programme, and secondary ECM characteristic of other programmes.

In the first embodiment it is assumed that there are 15 D2MAC/Eurocrypt programmes. According to the invention, in the ECM channels of each of the programmes, transmission takes place of the ECM of all the programmes. For example, in programme 1, there are the main ECM ECM1 characteristic of programme 1 and the secondary ECM ECM2, ECM3, ECM4, . . . ECM15 characteristic of the 14 other programmes. The terminal uses the main ECM for descrambling the programme to which it is connected and stores the secondary ECM in order to use them in the case of switching.

The main ECM can be transmitted every 0.5 s (i.e. a frequency of Fp=2), whereas the secondary ECM can e.g. be transmitted every 7 s (the process functions if they are transmitted at least once per phase). In this particular case, the rate D necessary for transporting the ECM of the 15 programmes is equal to 4 ECM per second.

Figure 1:
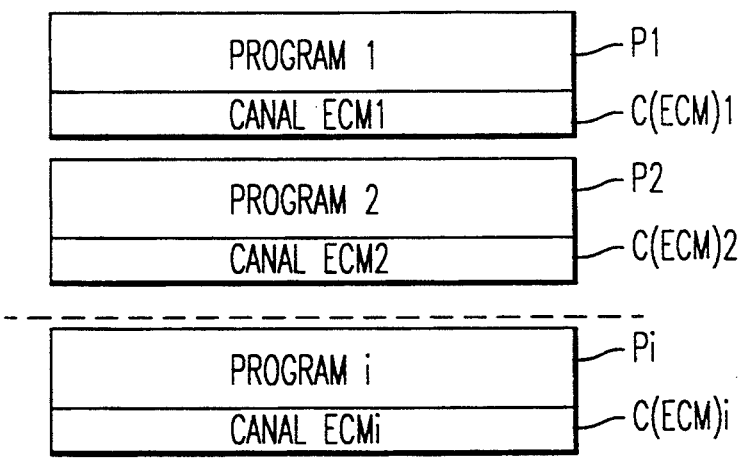
FIG. 1, already described, shows the diagrammatic structure of ECM messages and programme channels.
Figure 2:
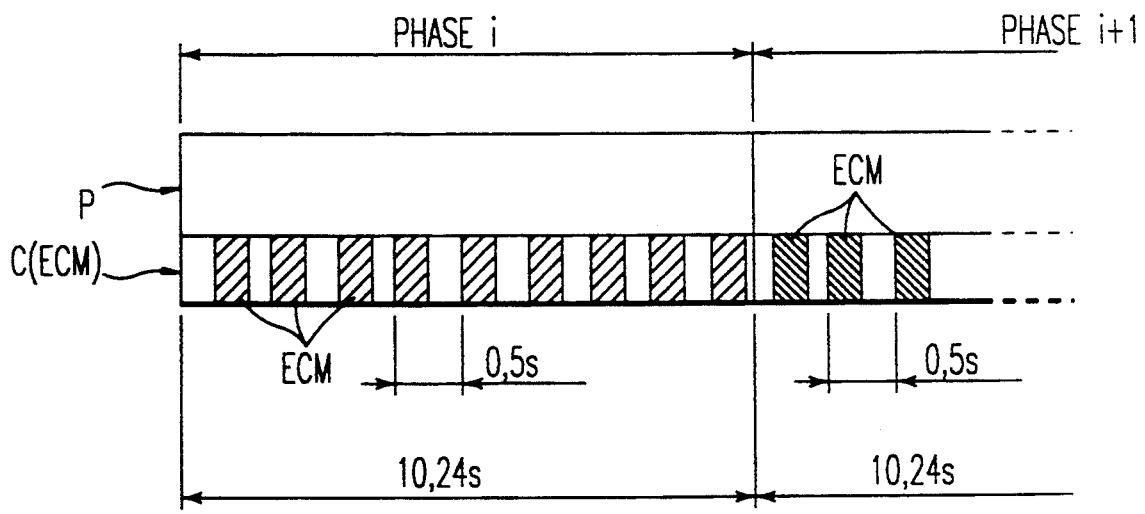
FIG. 2, already described, shows the structure of an ECM channel.
Figure 3:
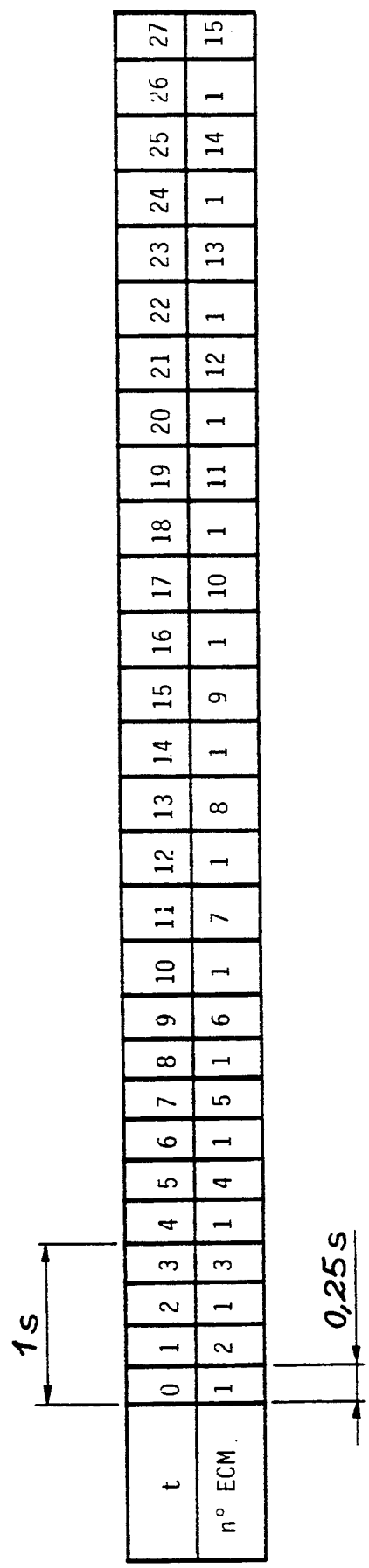
FIG. 3 shows an example of multiplexing ECM messages according to the invention.

Therefore, in this case, the ECM channel of each programme conveys 4 ECM per second. FIG. 3 shows in exemplified manner for the programme 1, the content of the ECM channel every 0.25 s for the first 7 seconds of a phase. The ECM number designates the programme to which the ECM belongs. In this example the main programme is programme 1. The message ECM1 in this example is conveyed every 0.5 s.

At the different intervals, designated t, the following ECM occur:

at t=0: the main ECM characteristic of programme 1,
at t=1: the secondary ECM characteristic of programme 2,
at t=2: again the main ECM characteristic of programme 1,
at t=3: the secondary ECM characteristic of programme 3,
at t=4: again the main ECM characteristic of programme 1,
at t=5: etc.
at t=26: again the main ECm characteristic of programme 1,
at t=27: the secondary ECM characteristic of programme 15.

In this example, for any given programme, the check message characteristic of said programme is regularly repeated and, between two successive messages characteristic of said programme, are successively inserted all the other ECM check messages characteristic of the other programmes.

In the second example, it is assumed that the ECM channel rate cannot be increased. It is possible to send the secondary ECM by decreasing the main ECM sending frequency Fp (the acquisition time of the first ECM on connection being naturally increased). In this case where N=15 and where the transmission frequency Fs of a secondary ECm is 1/10 (once per phase), we obtain D=2. The above relation gives Fp=0.6. Therefore the main ECM are transmitted every 1.66 s instead of twice per second.

When the transmission process described hereinbefore is used, the terminal no longer has to wait for an ECm after zapping, because it has already read and stored the ECm of all the programmes. Moreover, the calculation of the check word by the card PC2 (requiring a time Tcalc) can take place in parallel with the signal acquisition time. The zapping time becomes equal to the maximum of (Tacq+Tvoie-serv, Tcalc).

If there is a rapid acquisition of the service channel, the time (Tacq+Tvoie-serv) will probably be less than Tcalc. The zapping time is then equal to Tcalc=350 ms.

It is interesting to note that the performance of the process according to the invention requires no modification of card PC2.

We claim:

1. Process of reducing program switching times of scrambled conditional access programs synchronously transmitted with entitlement control messages having check words for descrambling the conditional access programs, wherein the check words for the conditional access programs are changed after a predetermined time period, comprising:
- transmitting main check messages (ECMp) for a main access program at a first frequency (Fp) a plurality of times during each said time period;
- transmitting secondary check messages (ECMs) for secondary access programs at second frequencies (Fs), lower than the first frequency (Fp), between two successive transmissions of the main check messages (ECMp) for the main access program; and
- setting the second frequencies (Fs) of the secondary check messages in order to transmit all of the secondary check messages (ECMs) for the secondary access programs during said each said time period such that all of the check words are available each said time period and the program switching time is reduced.

2. Process according to claim 1, further comprising:
- alternating the secondary check messages (ECMs) for the secondary access programs in consecutive order between each successive main check message (ECMp) of said main check messages (ECMp) for the main access program.

3. Process according to claim 1, wherein the first frequency (Fp) is equal to 2 of the main check messages (ECMp) per 1 second and each of the second frequencies (Fs) is equal to 1 of the secondary check messages (ECMs) per 7 seconds when the total number of conditional access channels is 15 and the time period is 7 seconds.

4. Process according to claim 1, further comprising:
- receiving the transmitted conditional access programs and corresponding said entitlement control messages;
- selectively descrambling one of the conditional access programs with the aid of one of the check words in the corresponding said entitlement control messages; and
- storing all of the rest of the entitlement control messages for all the other said conditional access programs in each said time period, such that any of the conditional access programs can be selectively descrambled rapidly and switching time is reduced.

5. Process according to claim 1, further comprising:
- switching the second frequency (Fs) of one of the secondary check messages (ECMs), selected by a subscriber as the main access program, to the first frequency (Fp) of the main check messages (ECMp).

* * * * *